L. C. FREEMAN & B. B. NEUTEBOOM.
CLUTCH.
APPLICATION FILED JULY 29, 1907.
913,370.
Patented Feb. 23, 1909.
2 SHEETS—SHEET 1.
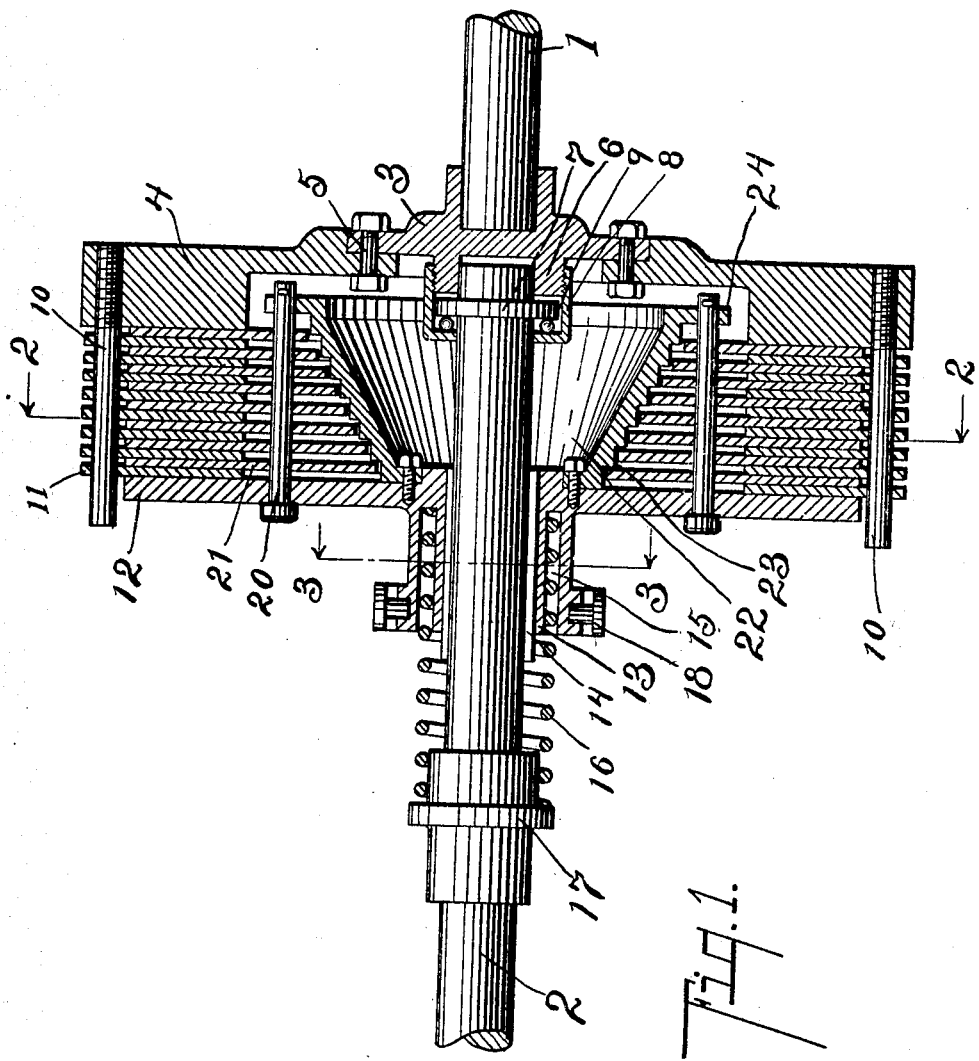

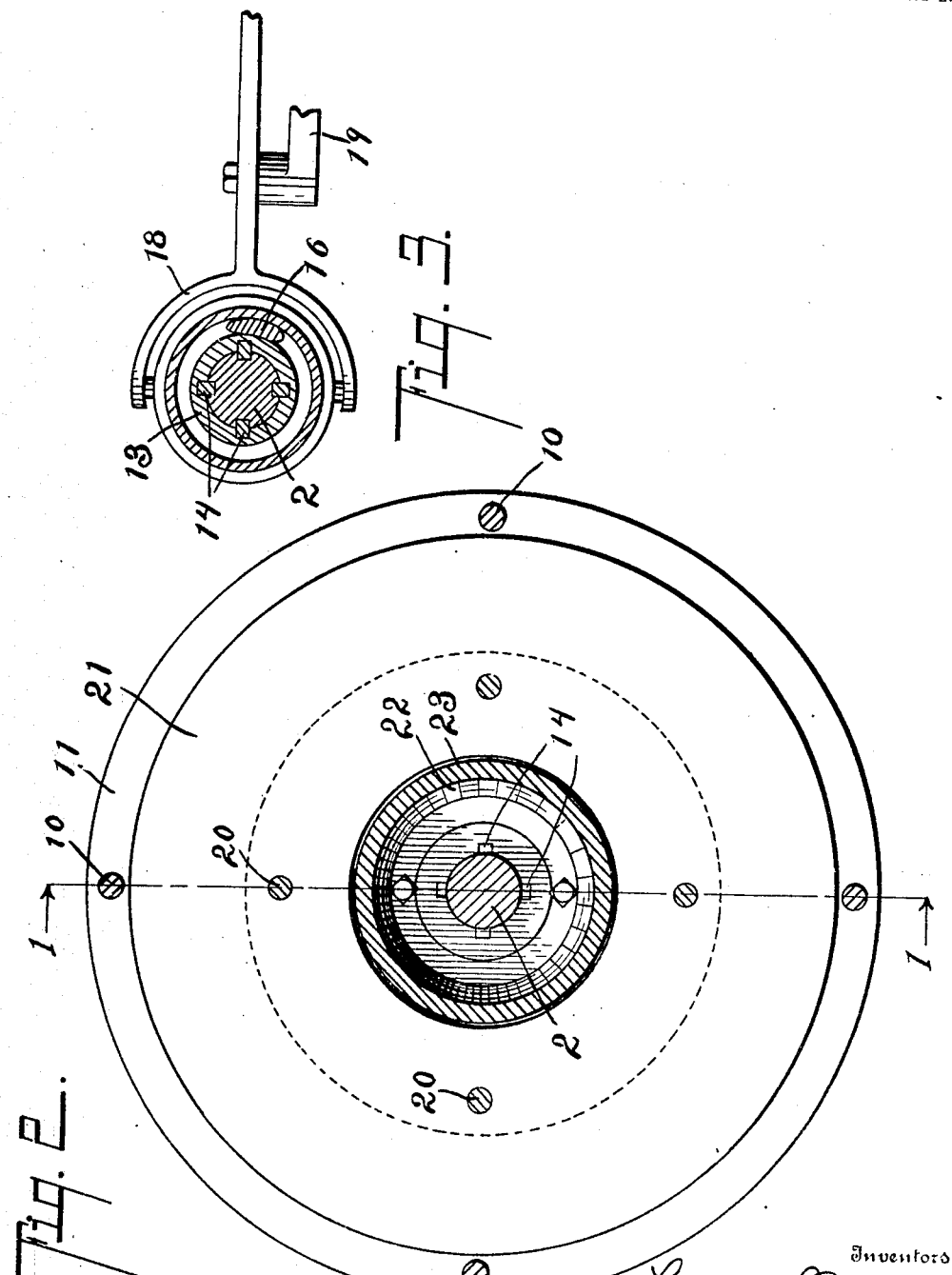

UNITED STATES PATENT OFFICE.

LOWELL C. FREEMAN AND BOUDEWYN B. NEUTEBOOM, OF DETROIT, MICHIGAN.

CLUTCH.

No. 913,370.          Specification of Letters Patent.          Patented Feb. 23, 1909.

Application filed July 29, 1907. Serial No. 386,015.

*To all whom it may concern:*

Be it known that we, LOWELL C. FREEMAN, a citizen of the United States, residing at the city of Detroit, county of Wayne, State of Michigan, and BOUDEWYN B. NEUTEBOOM, a subject of the Queen of the Netherlands, residing at the city of Detroit, county of Wayne, State of Michigan, United States of America, have invented certain new and useful Improvements in Clutches, of which the following is a specification.

This invention relates to improvements in clutches.

The main object of this invention is to provide an improved clutch of the disk type in which the friction disks are positively disengaged on the releasing of the clutch.

Further objects, and objects relating to details of construction, will definitely appear from the detailed description to follow.

We accomplish the objects of our invention by the devices and means described in the following specification.

The invention is clearly defined and pointed out in the claims.

A structure embodying the features of our invention is clearly illustrated in the accompanying drawing, forming a part of this specification, in which, Figure 1 is a longitudinal section through a structure embodying the features of our invention, taken on a line corresponding to line 1—1 of Fig. 2. Fig. 2 is a transverse section taken on a line corresponding to line 2—2 of Fig. 1. Fig. 3 is a detail transverse section taken on a line corresponding to line 3—3 of Fig. 1.

In the drawing, the sectional views are taken looking in the direction of the little arrows at the ends of the section lines, and similar numerals of reference refer to similar parts throughout the several views.

Referring to the drawing, 1 represents the driving shaft and 2 the driven shaft. The driving clutch member is secured to the driving shaft and preferably consists of a hub-like portion 3 on which the disk 4 is rigidly secured by means of suitable bolts, as 5. On the inside of the hub 3 is a bearing 6 adapted to receive the end of the driven shaft, thereby maintaining the same in alinement with the driving shaft. The driven shaft is provided with a thrust collar 7 and a bearing cap 8, threaded upon the bearing 6, suitable bearing balls, as 9, being interposed between the bearing cap and the thrust collar.

A plurality of driving disks 11 is provided, these disks being connected to the driven member of the clutch by the driving pins 10. The driven clutch member 12 is provided with a hub-like portion 13, which is slidably mounted upon the driven shaft 2, and is keyed or splined thereto by means of the feathers 14. The hub 13 of the driven member is provided with a chamber 15, adapted to receive one end of the spring 16, the other end of which engages the collar 17 on the driven shaft. The spring, thus arranged, tends to hold the driven clutch member normally in its engaging or actuating position. The clutch member 12 is preferably actuated by means of the forked lever 18, pivoted upon a suitable bracket or arm 19.

The driven friction disks 21 are connected to the driven clutch member 12 by means of the driving pins 20. Arranged within the driven disks is a cone 22 having steps 23 thereon, adapted to engage the driven disks when the driven member is shifted for shifting the disks laterally, thereby positively releasing them from the driving disks. The steps or disk-engaging members 23 of the cone are preferably arranged so as to engage the driven disks successively, which insures the freeing of all of them. The cone 22 is preferably provided with a flange 24 at its inner end through which the inner ends of the pins 20 are arranged, thereby effectively supporting the same, which enables the making of the parts very light, and still possessing the required strength.

Our improved clutch, as will be obvious, is simple in structure, and at the same time is entirely effective for the purpose for which it is intended.

We have illustrated and described our improved clutch in detail in the form preferred by us on account of its structural simplicity and economy. We are, however, aware that it is capable of very great variation in structural details without departing from our invention, and we desire to be understood as claiming the same broadly, as well as specifically, as illustrated.

Having thus described our invention, what we claim as new and desire to secure by Letters Patent is:

1. In a clutch, the combination with a driving shaft, of a driven shaft; a driving member on said driving shaft; a plurality of driving friction disks; pins on said driving member arranged to engage said driving friction disks; a driven member splined upon said driven shaft; a plurality of driven friction disks alternated with said driving disks; pins carried by said driven member arranged to engage said driven disks; a stepped cone carried by said driven member arranged within said driven disks and adapted to engage the same successively on the shifting of said driven member to release the clutch; a spring for holding said driven member normally in its engaging position; and means for shifting said driven member out of its engaging position.

2. In a clutch, the combination with a driving shaft, of a driven shaft; a driving member on said driving shaft; a plurality of driving friction disks; pins on said driving member arranged to engage said driving friction disks; a driven member splined upon said driven shaft; a plurality of driven friction disks alternated with said driving disks; pins carried by said driven member arranged to engage said driven disks; and a stepped cone carried by said driven member arranged within said driven disks and adapted to engage the same successively on the shifting of said driven member to release the clutch.

3. In a clutch, the combination with a driving shaft, of a driven shaft; a driving member on said driving shaft; a plurality of driving friction disks connected thereto; a driven member splined upon said driven shaft; a plurality of driven friction disks connected to said driven member; a stepped cone carried by said driven member arranged within said driven disks and adapted to engage the same successively on the shifting of said driven member to release the clutch; a spring for holding said driven member normally in its engaging position; and means for shifting said driven member out of its engaging position.

4. In a clutch, the combination with a driving shaft, of a driven shaft; a driving member on said driving shaft; a plurality of driving friction disks connected thereto; a driven member splined upon said driven shaft; a plurality of driven friction disks connected to said driven member; and a stepped cone carried by said driven member arranged within said driven disks and adapted to engage the same successively on the shifting of said driven member to release the clutch.

5. In a clutch, the combination with a driving member; a plurality of driving disks connected thereto; a driven member; a plurality of driven disks connected thereto; and a stepped cone carried by said driven member arranged to engage the said driven disks successively on the shifting of said driven member to release the clutch.

6. In a clutch, the combination with a driving shaft, of a driven shaft; a driving member on said driving shaft; a plurality of driving friction disks; pins on said driving member arranged to engage said driving friction disks; a driven member splined on said driven shaft; a plurality of driven friction disks alternated with said driving disks; pins carried by said driven member arranged to engage said driven disks; a disk shifting member carried by said driven member and having a plurality of engaging portions thereon adapted to engage the driven disks successively on the shifting of the driven member to release the clutch.

7. In a clutch, the combination with a driving shaft; of a driven shaft, a driving member on said driving shaft; a plurality of driving friction disks; pins on said driving member arranged to engage said driving friction disks; a driven member splined on said driven shaft; a plurality of driven friction disks alternated with said driving disks; pins carried by said driven member arranged to engage said driven disks; a disk shifting member carried by said driven member and having a plurality of engaging portions thereon adapted to engage the driven disks on the shifting of the driven member to release the clutch.

8. In a clutch, the combination with a driving member; a plurality of driving disks connected thereto; a driven member; a plurality of driven disks connected thereto, said disks having central openings therein; a member for shifting said disks arranged through said openings in said disks and having continuous circumferential disk engaging portions adapted to successively engage the disks of one set whereby they are successively and positively shifted on the releasing of the clutch.

9. In a clutch, the combination with a driving member; a plurality of driving disks connected thereto; a driven member; a plurality of driven disks connected thereto, said disks having central openings therein; a member for shifting said disks arranged through said openings in said disks and having continuous circumferential disk-engaging portions adapted to engage the disks of one set whereby they are shifted on the releasing of the clutch.

10. In a clutch, the combination with a driving member; a plurality of driving disks connected thereto; a driven member; a plurality of driven disks connected thereto; and a stepped disk-shifting member arranged to engage one set of disks successively on the releasing of the clutch, whereby they are shifted, positively disengaging the same, said shifting member being adapted to engage the disks successively and move them varying distances.

11. In a clutch, the combination with a driving member; a plurality of driving disks connected thereto; a driven member; a plurality of driven disks connected thereto; and a stepped disk-shifting member arranged to engage one set of disks on the releasing of the clutch whereby they are shifted, positively disengaging the same.

12. In a clutch, the combination with a driving member; a plurality of driving disks connected thereto; a driven member; a plurality of driven disks connected thereto; a member for shifting said disks having annular disk engaging portions adapted to successively engage the disks of one set whereby they are successively and positively shifted on the releasing of the clutch.

13. In a clutch, the combination with a driving member; a plurality of driving disks connected thereto; a driven member; a plurality of driven disks connected thereto; a member for shifting said disks having annular disk engaging portions adapted to engage the disks of one set whereby they are positively shifted on the releasing of the clutch.

In witness whereof, we have hereunto set our hands and seals in the presence of two witnesses.

LOWELL C. FREEMAN. [L. S.]
BOUDEWYN B. NEUTEBOOM. [L. S.]

Witnesses:
JAMES F. HILL,
ELIZABETH HILL.